United States Patent
Yoshizaki et al.

(10) Patent No.: US 12,328,041 B2
(45) Date of Patent: Jun. 10, 2025

(54) ELECTRICAL STEEL SHEET MACHINING METHOD, MOTOR, AND MOTOR CORE PRODUCTION METHOD

(71) Applicant: JFE STEEL CORPORATION, Tokyo (JP)

(72) Inventors: Souichiro Yoshizaki, Tokyo (JP); Yukino Miyamoto, Tokyo (JP); Yoshiaki Zaizen, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 321 days.

(21) Appl. No.: 17/907,670

(22) PCT Filed: Feb. 16, 2021

(86) PCT No.: PCT/JP2021/005743
§ 371 (c)(1),
(2) Date: Sep. 29, 2022

(87) PCT Pub. No.: WO2021/205752
PCT Pub. Date: Oct. 14, 2021

(65) Prior Publication Data
US 2023/0127911 A1     Apr. 27, 2023

(30) Foreign Application Priority Data
Apr. 6, 2020   (JP) .................................. 2020-068482

(51) Int. Cl.
*H02K 15/02*    (2025.01)
*B23K 26/38*    (2014.01)
*B23K 101/36*   (2006.01)

(52) U.S. Cl.
CPC .............. *H02K 15/02* (2013.01); *B23K 26/38* (2013.01); *B23K 2101/36* (2018.08)

(58) Field of Classification Search
CPC ................................. H02K 15/02; B23K 26/38
See application file for complete search history.

(56) References Cited

U.S. PATENT DOCUMENTS 5,578,228 A     11/1996  Beyer et al.
6,249,072 B1 *   6/2001  Sakagami ............ H02K 15/022
                                                310/216.004

(Continued)

FOREIGN PATENT DOCUMENTS

CN     102820743 A    12/2012
CN     109817441 A     5/2019

(Continued)

OTHER PUBLICATIONS

Oct. 11, 2023, the Extended European Search Report issued by the European Patent Office in the corresponding European Patent Application No. 21783797.0.

(Continued)

*Primary Examiner* — Forrest M Phillips
(74) *Attorney, Agent, or Firm* — KENJA IP LAW PC

(57) ABSTRACT

Provided is a laser machining method that causes no degradation in magnetic properties for thin electrical steel sheets. An electrical steel sheet machining method comprises machining an electrical steel sheet to a predetermined shape by melt-cutting the electrical steel sheet using a laser, wherein a scanning rate of the laser in the melt-cutting is 10000 mm/min or more.

13 Claims, 2 Drawing Sheets

(56) References Cited

U.S. PATENT DOCUMENTS

| | | | |
|---|---|---|---|
| 10,892,089 B2 | 1/2021 | Kamimura et al. | |
| 11,335,485 B2 | 5/2022 | Oda et al. | |
| 2005/0272610 A1* | 12/2005 | Ivanov | A61B 18/20 |
| | | | 505/474 |
| 2010/0102045 A1 | 4/2010 | Ulrich | |
| 2020/0042848 A1* | 2/2020 | Oda | G06K 19/06159 |
| 2021/0125759 A1 | 4/2021 | Yoshizaki et al. | |

FOREIGN PATENT DOCUMENTS

| | | |
|---|---|---|
| CN | 110497101 A | 11/2019 |
| EP | 0655021 A1 | 5/1995 |
| EP | 2117764 A1 | 11/2009 |
| JP | H08500060 A | 1/1996 |
| JP | 2009005539 A | 1/2009 |
| JP | 2009263782 A | 11/2009 |
| JP | 2015193926 A | 11/2015 |
| JP | 2016196013 A | 11/2016 |
| JP | 2017080806 A | 5/2017 |
| JP | 2019183232 A | 10/2019 |
| TW | 201928087 A | 7/2019 |
| TW | 201944702 A | 11/2019 |
| TW | 201947040 A | 12/2019 |
| WO | WO-2021033660 A1 * | 2/2021 |

OTHER PUBLICATIONS

Oct. 30, 2023, Office Action issued by the Canadian Intellectual Property Office in the corresponding Canadian Patent Application No. 3,169,793.

Sep. 19, 2023, Office Action issued by the Korean Intellectual Property Office in the corresponding Korean Patent Application No. 10-2022-7029901 with English language concise statement of relevance.

Apr. 20, 2021, International Search Report issued in the International Patent Application No. PCT/JP2021/005743.

Jun. 14, 2022, Notification of Reasons for Refusal issued by the Japan Patent Office in the corresponding Japanese Patent Application No. 2021-523813 with English language Concise Statement of Relevance.

Oct. 5, 2021, Office Action issued by the Taiwan Intellectual Property Office in the corresponding Taiwanese Patent Application No. 110106209 with English language Search Report.

Feb. 22, 2025, Office Action issued by the China National Intellectual Property Administration in the corresponding Chinese Patent Application No. 202180018973.6 with English language search report.

* cited by examiner

ELECTRICAL STEEL SHEET MACHINING METHOD, MOTOR, AND MOTOR CORE PRODUCTION METHOD

TECHNICAL FIELD

The present disclosure relates to an electrical steel sheet machining method, for example, an electrical steel sheet machining method carried out to give an electrical steel sheet a desired shape. The present disclosure also relates to a motor including a core obtained by machining an electrical steel sheet, and a motor core production method.

BACKGROUND

The demand to reduce the size of motors, such as motors used in the aerospace field or cordless vacuum cleaners, is increasing in recent years. To reduce the size of such small motors while maintaining their power, rotation at higher speed is promoted. With the increase of the rotational speed of a motor, the excitation frequency of the iron core of the motor increases. Moreover, to make up for the decrease in motor torque resulting from the size reduction of the motor, the number of poles of the rotor magnet is increased in some cases. This further increases the excitation frequency of the iron core. Iron core material for such high speed motors is required to have low iron loss property at high frequencies. Means known to be effective include addition of a large amount of a specific resistance increasing element such as Si or Al and reduction in sheet thickness.

However, such addition of a large amount of an alloying element and thickness reduction are known to make it difficult to perform blanking for a motor core. Particularly in the case of reducing the size of motors as mentioned above, motor iron cores are very small. Hence, poor blanking workability of electrical steel sheets as iron core material causes a decrease in blanking yield rate and an increase in costs. Furthermore, electrical steel sheets, amorphous materials, etc. with high alloying addition amounts have high hardness and therefore die wear is severe, so that the die maintenance costs increase and the productivity decreases.

In view of this, for example in the case of machining a thin electrical steel sheet having a large alloying addition amount, laser machining whose productivity is not as high as blanking using a die may be employed. The use of laser machining in such a case has advantages such as low costs over blanking using a die. Under these circumstances, JP 2009-5539 A (PTL 1) proposes an electrical steel sheet machining method of melt-cutting a steel sheet by a laser instead of blanking using a die.

However, it is known that, in laser machining, strain is introduced into an electrical steel sheet as a result of heat input to and cooling of the steel sheet, and consequently the magnetic properties of the iron core material degrade. This degradation in the magnetic properties caused by the introduction of strain by the laser is greater than in the case of blanking. Thus, laser machining still needs improvement for use in motor core production.

CITATION LIST

Patent Literature

PTL 1: JP 2009-5539 A

SUMMARY

Technical Problem

It could therefore be helpful to provide a laser machining method that causes no degradation in magnetic properties particularly for thin electrical steel sheets.

Solution to Problem

We conducted research on the influences of the laser machining conditions on the iron core material properties and the mechanisms of the influences, and the conditions of electrical steel sheets whose magnetic properties are little influenced by laser machining. We consequently discovered that there are optimum ranges of conditions for the laser scanning rate and power and the material thickness. The present disclosure is based on this discovery. We thus provide the following.

1. An electrical steel sheet machining method comprising machining an electrical steel sheet to a predetermined shape by melt-cutting the electrical steel sheet using a laser, wherein a scanning rate of the laser in the melt-cutting is 10000 mm/min or more.

2. The electrical steel sheet machining method according to 1., wherein the electrical steel sheet has a thickness of 0.20 mm or less.

3. The electrical steel sheet machining method according to 1. or 2., wherein a power P in W of the laser and a scanning rate s in mm/min of the laser satisfy the following Formula (1) in relation to a thickness t in mm of the electrical steel sheet:

$$500t+50 \leq P/s \times 12000 \leq 2000t+100 \qquad (1).$$

4. The electrical steel sheet machining method according to any of 1. to 3., wherein the electrical steel sheet is irradiated with the laser in pulsed form.

5. The electrical steel sheet machining method according to any of 1. to 4., wherein the electrical steel sheet has a chemical composition containing (consisting of), in mass %, C: 0.01% or less, Si: 2.0% or more and 7.0% or less, Al: 0.001% or more and 4.0% or less, and Mn: 0.5% or less.

6. The electrical steel sheet machining method according to any of 1. to 5., wherein the electrical steel sheet has a Si concentration distribution in which a concentration of Si is lower in a sheet thickness central layer than in a steel sheet surface layer, and a difference between the concentration of Si in the sheet thickness central layer and the concentration of Si in the steel sheet surface layer is 0.5 mass % or more and 5 mass % or less.

7. The electrical steel sheet machining method according to any of 1. to 6., wherein an average content of Si in the electrical steel sheet in a thickness direction is 6.2 mass % or more and 6.7 mass % or less.

8. A motor comprising a core having a core shape obtainable by the electrical steel sheet machining method according to any of 1. to 7.

9. A motor core production method comprising: machining a plurality of electrical steel sheets to a core shape; and stacking the electrical steel sheets after the machining, wherein the electrical steel sheets each have a thickness of 0.20 mm or less, and in the machining, the electrical steel sheets are melt-cut by a laser at a laser scanning rate of 10000 mm/min or more.

Advantageous Effect

It is thus possible to achieve laser machining of an electrical steel sheet without causing degradation in magnetic properties after the machining. Accordingly, a thin electrical steel sheet with a large alloying addition amount, which is suitable for use in cores of small and high speed rotation motors in terms of magnetic properties but is difficult to be machined, can be machined by laser machining that is higher in machining yield rate than typical blanking. Moreover, the magnetic properties degrade little as a result of reducing strain introduction into the electrical steel sheet as mentioned above, so that a motor having excellent motor properties can be provided.

DETAILED DESCRIPTION

Figure 1:
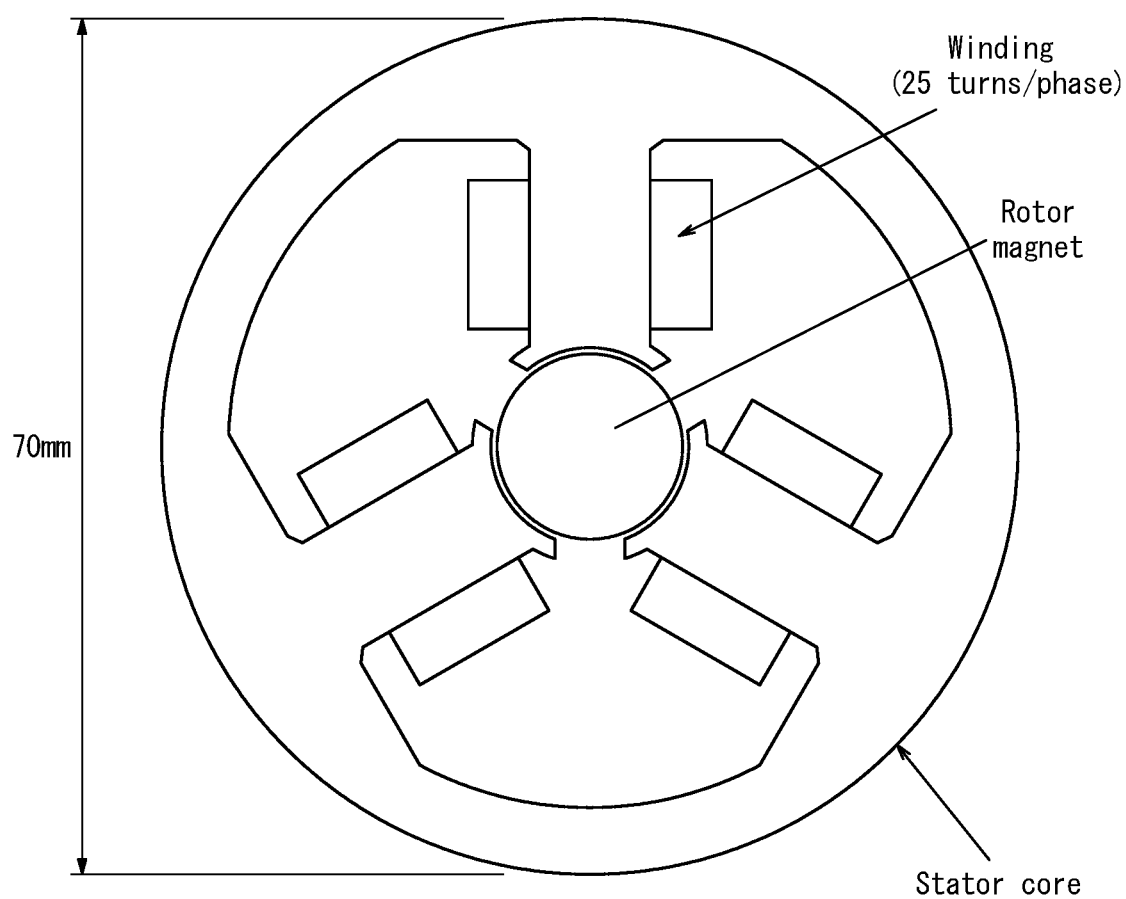
FIG. 1 is a cross-sectional view of a motor including a stator core used in an iron core production test (first example)

In our method of machining an electrical steel sheet (hereafter also simply referred to as "steel sheet"), it is important that, when melt-cutting an electrical steel sheet using a laser to machine the electrical steel sheet to a predetermined shape, the scanning rate of the laser is 10000 mm/min or more. By scanning a laser beam over the electrical steel sheet along the contour line of the predetermined shape, the electrical steel sheet is melt-cut along the contour line. Each of the melt-cutting conditions will be described below.

[Scanning Rate of Laser: 10000 mm/Min or More]

In the melt-cutting process, when the scanning rate of the laser is higher, the amount of energy input in the machining of the steel sheet is smaller, so that the strain introduced onto the machined end surface is reduced and the degradation in magnetic properties is suppressed. A high scanning rate is also advantageous from the viewpoint of productivity, and greatly contributes to lower production costs. Specifically, if the scanning rate of the laser is 10000 mm/min or more, the electrical steel sheet can be cut before the heat from the surface caused by the laser diffuses to the inside of the steel sheet and the region in which the magnetic properties are influenced widens. If the scanning rate of the laser is less than 10000 mm/min, the heat from the surface caused by the laser diffuses to the inside of the steel sheet and the influence on the magnetic properties increases. It is therefore effective to set the scanning rate of the laser to 10000 mm/min or more. The scanning rate of the laser is preferably 15000 mm/min or more.

Although no upper limit is placed on the scanning rate of the laser, the scanning rate of the laser is preferably 40000 mm/min or less given that it is more difficult to ensure the accuracy of the machined shape of the electrical steel sheet when the scanning rate of the laser is higher.

[Thickness of Steel Sheet: 0.20 mm or Less]

In the case where the electrical steel sheet is used for a core of a motor, the core material is required to have low iron loss property at high frequencies from the viewpoint of motor size reduction and the like. Accordingly, the thickness of the electrical steel sheet is preferably 0.20 mm or less, i.e. the range within which eddy current is reduced effectively. The thickness is more preferably 0.15 mm or less, and further preferably 0.10 mm or less. If the thickness of the electrical steel sheet is more than 0.20 mm, the blanking workability is not poor, and thus there is no need to employ laser machining. Blanking using a die is also advantageous in terms of production costs. If the electrical steel sheet is excessively thin, there is a possibility that a shape defect is caused by warpage after laser machining and a failure occurs in the subsequent stacking process. The thickness is therefore preferably 0.05 mm or more.

[Relationship Between Scanning Rate and Power of Laser]

The strain introduced into the steel sheet depends on the balance between the power and the scanning rate of the laser. Hence, there is a preferable range of the power and the scanning rate of the laser from the viewpoint of the magnetic properties. For example, even when the laser power is high, if the scanning rate is high, the amount of energy input in the machining of the steel sheet is reduced, and the influence on the magnetic properties is reduced. If the scanning rate is high but the laser power is low, the amount of incident energy is insufficient, and the characteristics of the machined end surface deteriorate, which may cause problems such as a failure to ensure the dimensional accuracy. It is therefore preferable to control the relationship between the scanning rate and the power of the laser. In detail, it is preferable that the scanning rate s (mm/min) and the power P (W) of the laser satisfy the following Formula (1) in relation to the thickness t (mm) of the electrical steel sheet:

$$500t+50 \leq P/s \times 12000 \leq 2000t+100 \tag{1}$$

$(P/s \times 12000)$ in Formula (1) is an index of incident energy. To ensure melt-cutting, $(P/s \times 12000)$ is preferably greater than or equal to a lower limit $(500t+50)$. To prevent deterioration in the characteristics of the machined end surface caused by unwanted strain introduction into the steel sheet, $(P/s \times 12000)$ is preferably less than or equal to an upper limit $(2000t+100)$. The upper limit and the lower limit depend on the sheet thickness.

[Pulsed Laser Irradiation]

An effective way of reducing the strain introduced into the steel sheet during the laser machining is to use a pulsed laser. The use of the pulsed laser can reduce the heat-affected zone and further suppress the strain introduction.

[Chemical Composition of Electrical Steel Sheet]

The electrical steel sheet preferably has a chemical composition containing C: 0.01 mass % or less, Si: 2.0 mass % or more and 7.0 mass % or less, Al: 0.001 mass % or more and 4.0 mass % or less, and Mn: 0.5 mass % or less. The electrical steel sheet may have, for example, a concentration distribution in which the concentration of Si varies in the thickness direction, as described later. Even in the case where the electrical steel sheet has such a concentration distribution, the electrical steel sheet preferably has the foregoing chemical composition. Preferably, the balance consists of iron and inevitable impurities. The reasons for adding each component will be given below.

C: 0.01 mass % or less

If the C content in the steel sheet is excessively high, magnetic aging occurs and the magnetic properties degrade. The C content is therefore preferably 0.01 mass % or less.

The C content is more preferably 0.001% or less. Since a lower C content is more preferable, no lower limit is placed on the C content.

Si: 2.0 mass % or more and 7.0 mass % or less
Al: 0.001 mass % or more and 4.0 mass % or less
Mn: 0.5 mass % or less These three elements each increase the specific resistance of the electrical steel sheet and reduce the eddy current loss. Accordingly, it is preferable to add Si in an amount of 2.0 mass % or more, Al in an amount of 0.001 mass % or more, and Mn in an amount of 0.005 mass % or more. If the Si content is less than 2.0%, the difficulty associated with blanking using a die does not occur, and thus there is no need to employ laser machining. If the content of each of the three elements is excessively high, the saturation magnetic flux density of the electrical steel sheet decreases. Accordingly, the Si content is 7.0 mass % or less, the Al content is 4.0 mass % or less, and the Mn content is 0.5 mass % or less. The reason why the upper limit of the Mn content is noticeably lower than those of the other two elements is because adding Mn causes the coefficient of thermal expansion of the steel sheet to increase and the range of strain introduction by laser machining to increase.

[Si Concentration Distribution]

It is preferable that the electrical steel sheet has a Si concentration distribution in which the concentration of Si is lower in a sheet thickness central layer than in a steel sheet surface layer, and the difference between the concentration of Si in the sheet thickness central layer and the concentration of Si in the steel sheet surface layer is 0.5 mass % or more and 5 mass % or less. As a result of the electrical steel sheet having such a distribution in which the concentration of Si is lower in the sheet thickness central layer than in the steel sheet surface layer in the thickness direction of the steel sheet, the eddy current loss can be reduced, with it being possible to reduce the high-frequency iron loss. Since the eddy current loss concentrates in the surface layer in the thickness direction of the steel sheet due to skin effect, high specific resistance in the surface layer in the thickness direction of the steel sheet is effective in eddy current reduction. To achieve this effect, the difference in the concentration of Si between the surface layer and the central layer of the steel sheet needs to be 0.5 mass % or more. If the difference in the concentration of Si between the surface layer and the central layer is more than 5 mass %, the difference in magnetostriction between the surface layer and the central layer is large, and the hysteresis loss increases. The difference in the concentration of Si between the surface layer and the central layer of the steel sheet is therefore preferably 0.5 mass % or more and 5 mass % or less. The difference in the concentration of Si is more preferably 1.5 mass % to 3.5 mass %.

Here, the difference in the concentration of Si is determined as follows: Suppose the steel sheet is divided into thirds in the thickness direction. The layer from each of the front and back sides to ⅓ of the sheet thickness is defined as the surface layer, and the layer of ⅓ of the sheet thickness including the mid-thickness part and sandwiched between the surface layers is defined as the central layer. The concentration of Si in each layer is defined by the average value in the thickness direction. The difference in concentration may be determined by evaluating the Si concentration distribution in a cross section of the steel sheet using EPMA, or by performing wet analysis on samples obtained by reducing the sheet thickness to ⅓ through, for example, chemical polishing on one or both sides of the steel sheet.

[Other Conditions]

The other laser conditions such as laser beam diameter and assist gas are not limited, and any conditions may be used as long as the desired end surface characteristics and the like can be obtained. For example, when machining an electrical steel sheet into a core, a small laser diameter is used in the case of machining the electrical steel sheet to a fine shape such as the tips of the teeth of the core. Moreover, in the case where the oxidation of the machined end surface needs to be suppressed, not $O_2$ but $N_2$ or Ar is used as assist gas. As a laser machining device, any machining device and laser source may be used as long as the predetermined laser conditions are satisfied.

The need for insulating coating on the steel sheet is the same as typical electrical steel sheets. The steel sheet may have an insulating coating having sufficient insulation performance on one or both sides beforehand. The electrical steel sheet subjected to our electrical steel sheet machining method is not limited as long as the steel sheet satisfies the conditions described above. For example, the electrical steel sheet may be high-alloy material or clad steel, and may be subjected to siliconizing treatment including a CVD process in order to have the difference in the concentration of Si in the thickness direction.

[Motor Core Production Method]

Our electrical steel sheet machining method is advantageous particularly when producing a motor core. In detail, in a motor core production method comprising machining a plurality of electrical steel sheets to a core shape and stacking the electrical steel sheets after the machining, by melt-cutting the electrical steel sheets by a laser at a laser scanning rate of 10000 mm/min or more in the machining, a motor core suitable for a higher-efficiency motor can be obtained. The method of stacking the steel sheets after the machining is not limited, and the steel sheets may be fixed to each other, for example, by caulking or adhesion.

Our techniques are advantageous in that strain relief annealing after core formation is unnecessary, although not only the production costs but also the plant and equipment investment costs are relatively high. For example, if the material with the inclined Si concentration is annealed, Si diffuses and the difference in the concentration of Si desirable for the magnetic properties is lost. It is therefore preferable not to perform strain relief annealing.

EXAMPLES

First Example

Non-oriented electrical steel sheets of 0.20 mm in thickness and having a composition containing the components listed in Table 1 with the balance consisting of iron and inevitable impurities were used to produce a two-pole, three-phase brushless DC motor of a cross-sectional shape illustrated in FIG. 1, and the efficiency of the motor was evaluated. In detail, a plurality of non-oriented electrical steel sheets were irradiated with a laser under the conditions listed in Table 2 to be melt-cut according to the shape of the stator core illustrated in FIG. 1, and then the machined steel sheets were stacked and fixed to each other by impregnating adhesion to obtain a laminate core of 15 mm in thickness. The motor production conditions other than the laser conditions listed in Table 2 were the same.

The motor properties were evaluated under the uniform driving conditions of 80000 rpm-20 mNm by energizing the motor in PWM sine wave with a driving voltage of 25.2 V. The motor efficiency evaluation results are shown in Table 2 together with the laser conditions. As can be understood from Table 2, the motor efficiency was improved under the conditions of the laser scanning rate of 10000 mm/min or more. The motor efficiency was further improved significantly under the conditions of the laser scanning rate of 10000 mm/min or more and the laser power P (W) satisfying $500t+50 \leq P/s \times 12000 \leq 2000t+100$ in relation to the thickness t (mm) of the electrical steel sheet. The maximum motor efficiency was achieved under the conditions of the laser power of 150 W and the scanning rate of 12000 mm/min. On the other hand, under the conditions of the laser power of 100 W and the scanning rate of 12000 mm/min, the electrical steel sheets could not be machined and the motor was unable to be produced.

TABLE 1

| Chemical composition (mass %) | | | |
|---|---|---|---|
| C | Si | Al | Mn |
| 0.0003 | 3.6 | 0.5 | 0.1 |

TABLE 2

| | | Laser conditions | | | | |
|---|---|---|---|---|---|---|
| No. | Thickness (mm) | Power (W) | Scanning rate (mm/min) | Oscillation method | Formula (1) | Motor efficiency (%) | Remarks |
| 1 | 0.2 | 600 | 3000 | Continuous | Not satisfied | 81.1 | Comparative Example |
| 2 | 0.2 | 600 | 6000 | Continuous | Not satisfied | 81.7 | Comparative Example |
| 3 | 0.2 | 600 | 9000 | Continuous | Not satisfied | 81.8 | Comparative Example |
| 4 | 0.2 | 600 | 12000 | Continuous | Not satisfied | 84.1 | Example |
| 5 | 0.2 | 600 | 15000 | Continuous | Satisfied | 85.5 | Example |
| 6 | 0.2 | 600 | 18000 | Continuous | Satisfied | 85.7 | Example |
| 7 | 0.2 | 250 | 3000 | Continuous | Not satisfied | 81.2 | Comparative Example |
| 8 | 0.2 | 250 | 6000 | Continuous | Satisfied | 81.8 | Comparative Example |
| 9 | 0.2 | 250 | 9000 | Continuous | Satisfied | 81.5 | Comparative Example |
| 10 | 0.2 | 250 | 9900 | Continuous | Not satisfied | 82.6 | Comparative Example |
| 11 | 0.2 | 250 | 10000 | Continuous | Not satisfied | 85.7 | Example |
| 12 | 0.2 | 250 | 12000 | Continuous | Satisfied | 86.9 | Example |
| 13 | 0.2 | 250 | 15000 | Continuous | Satisfied | 86.9 | Example |
| 14 | 0.2 | 250 | 18000 | Continuous | Satisfied | 87.4 | Example |
| 15 | 0.2 | 150 | 12000 | Continuous | Satisfied | 87.9 | Example |
| 16 | 0.2 | 100 | 12000 | Continuous | Not satisfied | 85.0 | Example |
| 17 | 0.2 | 800 | 18000 | Continuous | Not satisfied | 84.7 | Example |
| 18 | 0.2 | 800 | 12000 | Continuous | Not satisfied | 83.9 | Example |

Second Example

Figure 2:
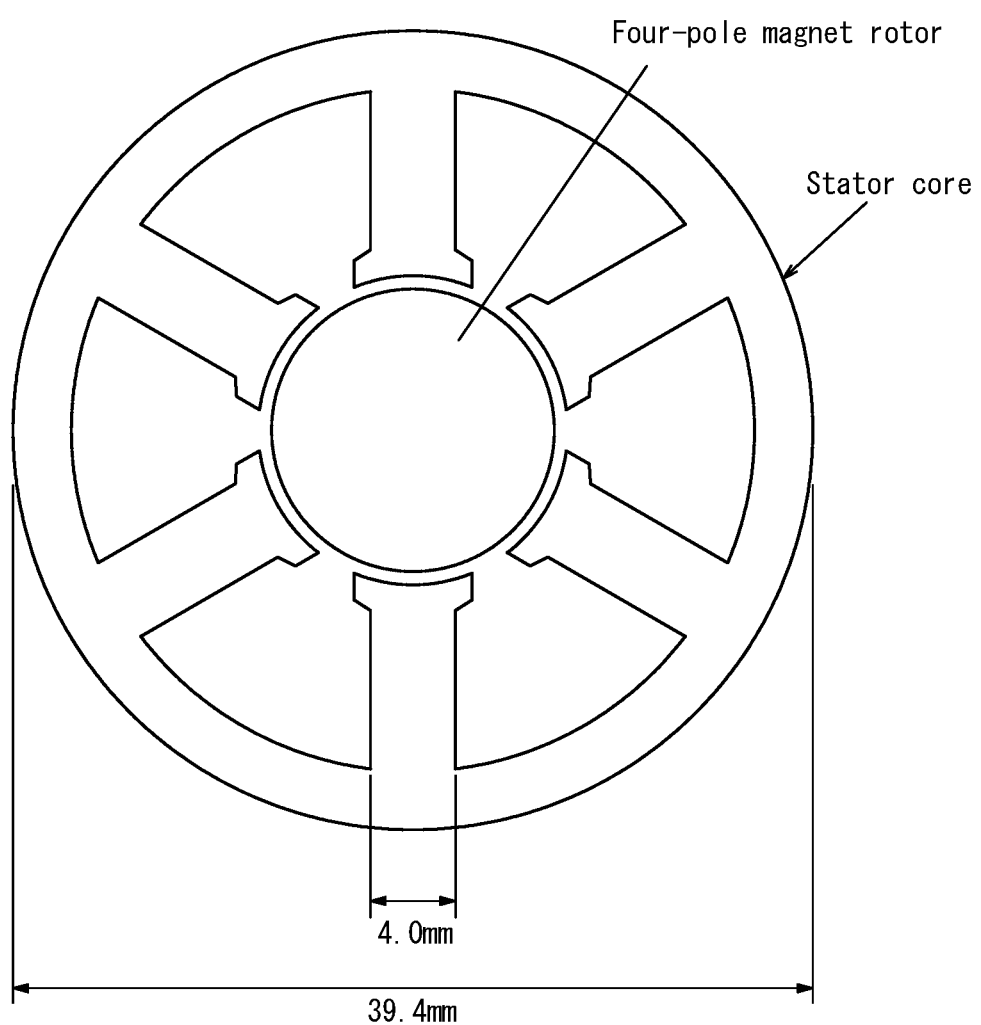
FIG. 2 is a cross-sectional view of a motor including a stator core used in an iron core production test (second example).

Non-oriented electrical steel sheets having a composition containing the components listed in Table 3 with the balance consisting of iron and inevitable impurities were used to produce a four-pole, six-slot brushless DC motor of a cross-sectional shape illustrated in FIG. 2, and the efficiency of the motor was evaluated. In detail, a plurality of non-oriented electrical steel sheets were irradiated with a laser under the conditions listed in Table 4 to be melt-cut according to the shape of the stator core illustrated in FIG. 2, and then the machined steel sheets were stacked and fixed to each other by impregnating adhesion to obtain a laminate core of 20 mm in thickness. The motor production conditions other than the laser conditions listed in Table 4 were the same.

The motor properties were evaluated under the uniform driving conditions of 105000 rpm-25 mNm by energizing the motor in PWM sine wave with a driving voltage of 25.2 V. The laser conditions, the material conditions, and the motor efficiency evaluation results are shown in Table 4. In the laser oscillation method field in Table 4, "continuous" indicates continuous laser oscillation, and "pulsed" indicates pulsed laser oscillation of a pulse width of 30 μsec and a shot interval of 12 μm.

As can be understood from Table 4, the motor efficiency was less than 85% in each material under the conditions of the laser scanning rate of less than 10000 mm/min. Meanwhile, the motor efficiency improved significantly under the conditions of the laser scanning rate of 10000 mm/min or more. The improvement differed greatly among the materials, and was great in the case where the material had a Si concentration distribution in the thickness direction. The motor efficiency was further improved in the case where the laser oscillation was not continuous but pulsed.

TABLE 3

| | Chemical composition (mass %) | | | | | | |
|---|---|---|---|---|---|---|---|
| | | | Si | | | | |
| Component symbol | C | Average | Surface layer | Central layer | ΔSi | Al | Mn |
| A | 0.0008 | 3.5 | 3.5 | 3.5 | 0.0 | 0.3 | 0.1 |
| B | 0.0004 | 5.4 | 6.5 | 3.3 | 3.2 | 0.02 | 0.01 |
| C | 0.0004 | 6.5 | 6.5 | 6.5 | 0.0 | 0.02 | 0.01 |
| D | 0.0004 | 3.5 | 4.0 | 2.5 | 1.5 | 0.02 | 0.01 |

TABLE 4

| No. | Electrical steel sheet Component symbol | Thickness (mm) | Laser conditions Power (W) | Scanning rate (mm/min) | Oscillation method | Formula (1) | Motor efficiency (%) | Remarks |
|---|---|---|---|---|---|---|---|---|
| 19 | A | 0.1 | 200 | 9000 | Continuous | Satisfied | 84.5 | Comparative Example |
| 20 | A | 0.1 | 200 | 15000 | Continuous | Satisfied | 86.1 | Example |
| 21 | A | 0.1 | 200 | 20000 | Continuous | Satisfied | 86.2 | Example |
| 22 | A | 0.1 | 200 | 20000 | Pulsed | Satisfied | 87.4 | Example |
| 23 | B | 0.1 | 200 | 9000 | Continuous | Satisfied | 84.7 | Comparative Example |
| 24 | B | 0.1 | 200 | 9000 | Pulsed | Satisfied | 84.8 | Comparative Example |
| 25 | B | 0.1 | 200 | 15000 | Continuous | Satisfied | 87.9 | Example |
| 26 | B | 0.1 | 200 | 15000 | Pulsed | Satisfied | 89.2 | Example |
| 27 | B | 0.1 | 200 | 20000 | Continuous | Satisfied | 88.1 | Example |
| 28 | B | 0.1 | 200 | 20000 | Pulsed | Satisfied | 89.4 | Example |
| 29 | C | 0.1 | 150 | 18000 | Pulsed | Satisfied | 90.4 | Example |
| 30 | D | 0.1 | 150 | 18000 | Continuous | Satisfied | 89.9 | Example |

The invention claimed is:

1. An electrical steel sheet machining method comprising:
Machining an electrical steel sheet to a predetermined shape by melt-cutting the electrical steel sheet using a laser,
Wherein a scanning rate in the melt-cutting is 10000 mm/min or more, and
Wherein a power P in W of the laser and a scanning rate in s in mm/min of the laser satisfy the following formula in relation to a thickness t in mm of the electrical steel sheet:

$$500t+50 \leq P/s \times 12000 \leq 2000t+100 \quad (1).$$

2. The electrical steel sheet machining method according to claim 1, wherein the electrical steel sheet has a thickness of 0.20 mm or less.

3. The electrical steel sheet machining method according to claim 1, wherein the electrical steel sheet is irradiated with the laser in pulsed form.

4. The electrical steel sheet machining method according to claim 1, wherein the electrical steel sheet has a chemical composition containing, in mass %, C: 0.01% or less, Si: 2.0% or more and 7.0% or less, Al: 0.001% or more and 4.0% or less, and Mn: 0.5% or less.

5. The electrical steel sheet machining method according to claim 1, wherein the electrical steel sheet has a Si concentration distribution in which a concentration of Si is lower in a sheet thickness central layer than in a steel sheet surface layer, and a difference between the concentration of Si in the sheet thickness central layer and the concentration of Si in the steel sheet surface layer is 0.5 mass % or more and 5 mass % or less.

6. The electrical steel sheet machining method according to claim 1, wherein an average content of Si in the electrical steel sheet in a thickness direction is 6.2 mass % or more and 6.7 mass % or less.

7. A motor comprising
a core having a core shape obtainable by the electrical steel sheet machining method according to claim 1.

8. A motor core production method comprising:
machining a plurality of electrical steel sheets to a core shape; and
stacking the electrical steel sheets after the machining, wherein the electrical steel sheets each have a thickness of 0.20 mm or less, and
in the machining, the electrical steel sheets are melt-cut by a laser at a laser scanning rate of 10000 mm/min or more, and
wherein a power P in W of the laser and a scanning rate s in mm/min of the laser satisfy the following Formula (1) in relation to a thickness t in mm of the electrical steel sheet:

$$500t+50 \leq P/s \times 12000 \leq 2000t+100 \quad (1).$$

9. A motor core production method comprising:
Machining a plurality of electrical steel sheets to a core shape; and
Stacking the electrical steel sheets after the machining,
Wherein the electrical steel sheets each have a thickness of 0.20 mm or less, and
In the machining, the electrical steel sheets are melt-cut by a laser at a laser scanning rate of 10000 mm/min or more, and
Wherein a power P in W of the laser and a scanning rate in s in mm/min of the laser satisfy the following formula in relation to a thickness t in mm of the electrical steel sheet:

$$500t+50 \leq P/s \times 12000 \leq 2000t+100.$$

10. The electrical steel sheet machining method according to claim 2, wherein the electrical steel sheet has a chemical composition containing, in mass %, C: 0.01% or less, Si: 2.0% or more and 7.0% or less, Al: 0.001% or more and 4.0% or less, and Mn: 0.5% or less.

11. The electrical steel sheet machining method according to claim 2, wherein the electrical steel sheet has a Si concentration distribution in which a concentration of Si is lower in a sheet thickness central layer than in a steel sheet surface layer, and a difference between the concentration of Si in the sheet thickness central layer and the concentration of Si in the steel sheet surface layer is 0.5 mass % or more and 5 mass % or less.

12. The electrical steel sheet machining method according to claim 2, wherein an average content of Si in the electrical steel sheet in a thickness direction is 6.2 mass % or more and 6.7 mass % or less.

13. A motor comprising a core having a core shape obtainable by the electrical steel sheet machining method according to claim 2.

* * * * *